United States Patent
Bugenhagen et al.

(10) Patent No.: US 10,129,185 B2
(45) Date of Patent: Nov. 13, 2018

(54) SYSTEM AND METHOD FOR IMPLEMENTING VIRTUAL PLATFORM MEDIA ACCESS CONTROL (MAC) ADDRESS-BASED LAYER 3 NETWORK SWITCHING

(71) Applicant: CenturyLink Intellectual Property LLC, Denver, CO (US)

(72) Inventors: Michael K. Bugenhagen, Leawood, KS (US); William R. Walker, Monroe, LA (US); Kevin M. McBride, Lone Tree, CO (US)

(73) Assignee: CenturyLink Intellectual Property LLC, Denver, CO (US)

(*) Notice: Subject to any disclaimer, the term of this patent is extended or adjusted under 35 U.S.C. 154(b) by 67 days.

(21) Appl. No.: 15/222,698

(22) Filed: Jul. 28, 2016

(65) Prior Publication Data

US 2017/0264570 A1    Sep. 14, 2017

Related U.S. Application Data

(60) Provisional application No. 62/307,192, filed on Mar. 11, 2016.

(51) Int. Cl.
*H04L 12/931* (2013.01)
*H04L 29/06* (2006.01)
(Continued)

(52) U.S. Cl.
CPC ............ *H04L 49/70* (2013.01); *H04L 45/42* (2013.01); *H04L 45/64* (2013.01); *H04L 45/66* (2013.01);
(Continued)

(58) Field of Classification Search
None
See application file for complete search history.

(56) References Cited

U.S. PATENT DOCUMENTS

| | | | | |
|---|---|---|---|---|
| 6,850,495 B1* | 2/2005 | Baum | ................. | H04L 12/4641 370/256 |
| 6,993,026 B1* | 1/2006 | Baum | ................. | H04L 12/4633 370/392 |

(Continued)

FOREIGN PATENT DOCUMENTS

WO    WO-2005-003882 A2    1/2005

OTHER PUBLICATIONS

International Search Report and Written Opinion prepared by the Korean Intellectual Property Office as International Searching Authority for PCT International Patent Appl. No. PCT/US0271/020485 dated Jun. 5, 2017; 13 pages.
International Preliminary Report on Patentability, dated Sep. 11, 2018, 10 pages.

*Primary Examiner* — George C Atkins
(74) *Attorney, Agent, or Firm* — Swanson & Bratschun, L.L.C.

(57) ABSTRACT

Novel tools and techniques might provide for implementing virtual platform media access control ("MAC") address—based layer 2 and layer 3 network switching. In some embodiments, a method might comprise receiving, at a network node in a network, a data packet having a header comprising a MAC destination address, and routing, with the network node, the data packet over open systems interconnection ("OSI") model layer 3 or network layer of the network, based at least in part on the MAC destination address in the header of the data packet. The MAC destination address comprises a first portion comprising an organizationally unique identifier ("OUI") and a second portion comprising an identifier for a destination network interface controller ("NIC") and/or virtual NIC ("VNIC"), which might be associated either with the same service provider associated with the network node or the network or with a different service provider, content provider, and/or application provider.

24 Claims, 8 Drawing Sheets

(51) Int. Cl.
*H04L 12/741* (2013.01)
*H04L 12/947* (2013.01)
*H04L 12/721* (2013.01)
*H04L 12/715* (2013.01)
*H04L 12/717* (2013.01)

(52) U.S. Cl.
CPC ............. *H04L 45/74* (2013.01); *H04L 49/25* (2013.01); *H04L 69/22* (2013.01); *H05K 999/99* (2013.01)

(56) References Cited

U.S. PATENT DOCUMENTS

| | | | |
|---|---|---|---|
| 7,869,432 B1* | 1/2011 | Mollyn | H04L 12/4625 370/221 |
| 2002/0024964 A1* | 2/2002 | Baum | H04L 12/4633 370/419 |
| 2009/0063706 A1* | 3/2009 | Goldman | H04L 45/00 709/250 |
| 2014/0201733 A1* | 7/2014 | Benny | G06F 9/455 718/1 |
| 2015/0222543 A1 | 8/2015 | Song | |
| 2016/0261428 A1* | 9/2016 | Song | H04L 12/413 |
| 2017/0180274 A1* | 6/2017 | Liu | H04L 49/70 |
| 2017/0188227 A1* | 6/2017 | Kang | H04L 67/16 |
| 2017/0237659 A1* | 8/2017 | Birrittella | H04L 45/745 370/392 |
| 2017/0353572 A1* | 12/2017 | Wang | H04L 67/2814 |

\* cited by examiner

US 10,129,185 B2

SYSTEM AND METHOD FOR IMPLEMENTING VIRTUAL PLATFORM MEDIA ACCESS CONTROL (MAC) ADDRESS-BASED LAYER 3 NETWORK SWITCHING

CROSS-REFERENCES TO RELATED APPLICATIONS

This application claims priority to U.S. Patent Application Ser. No. 62/307,192 (the "'192 application"), filed Mar. 11, 2016 by Michael K. Bugenhagen et al., entitled, "Virtual Platform MAC Steerable L2VPN Concept," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing virtual platforms within a network, and, in particular embodiments, to methods, systems, apparatuses, and computer software for implementing virtual platform media access control ("MAC") address—based layer 2 and layer 3 network switching.

BACKGROUND

Historically, media access control ("MAC") addresses are composed of a header or manufacturer identifier and a network interface serial number. This ensures a unique MAC addresses were used per port card. When virtual machines became prevalent, vendors making those virtual machines decided to obtain vendor identifiers in order to be used when their orchestrator dynamically created a virtual network interface card.

Today, data forwarding planes are based on subnets or groups of addresses, and the industry is virtualizing large portions of networks, which suggests that most if not all MAC addresses in the future might be virtual MAC addresses. MAC addresses (whether virtual or not), however, have never been used for "controlling" or "steering" traffic over the network layer (i.e., layer 3 of the open systems interconnection ("OSI") model, which currently uses Internet Protocol ("IP") address-based or equivalent routing of traffic).

Hence, there is a need for more robust and scalable solutions for implementing virtual platforms within a network, and, in particular embodiments, to methods, systems, apparatuses, and computer software for implementing virtual platform MAC address—based layer 2 and layer 3 network switching.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1A:
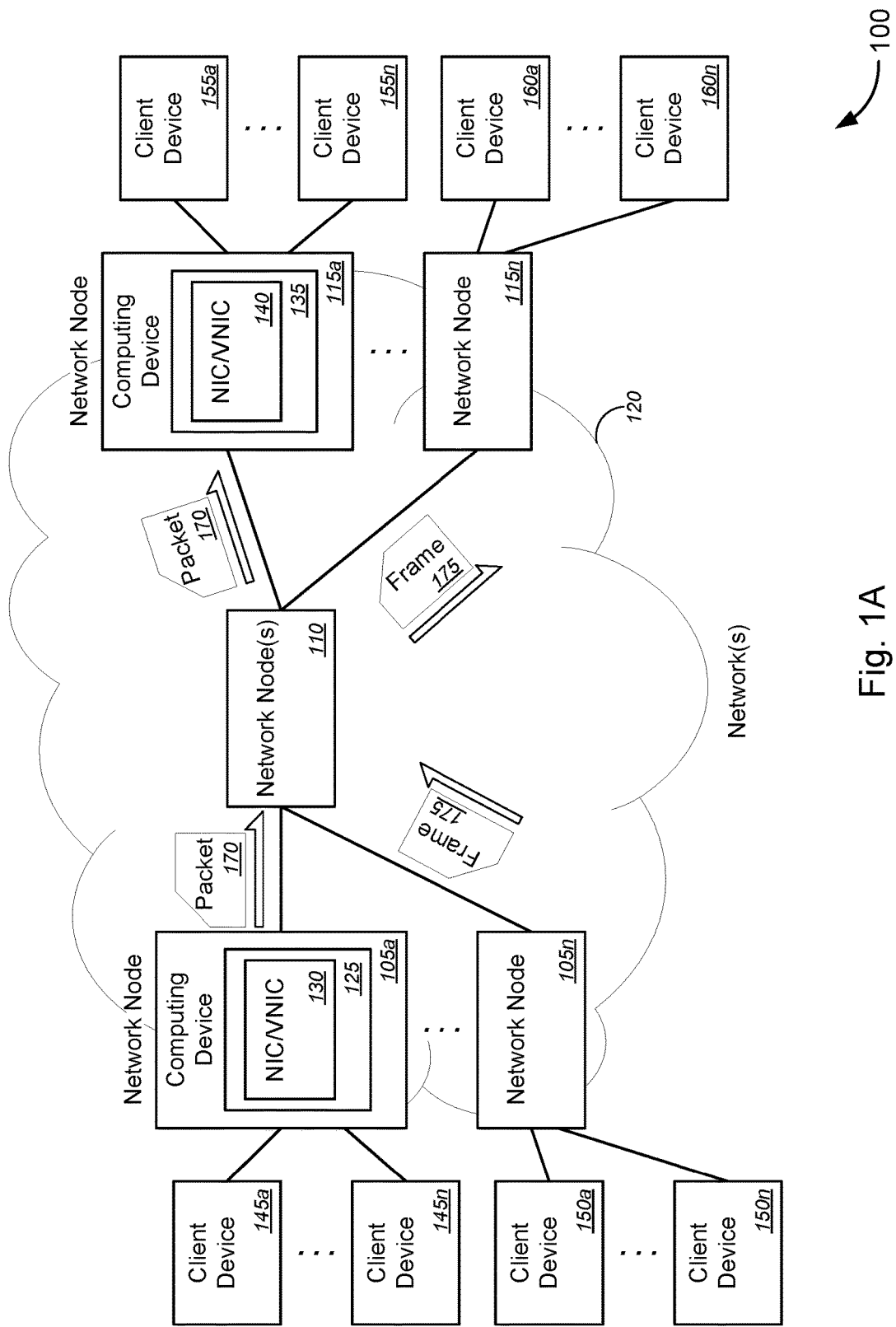
FIGS. 1A and 1B are schematic diagrams illustrating a system for implementing virtual platform media access control ("MAC") address—based layer 2 and layer 3 network switching, in accordance with various embodiments.

Various embodiments provide tools and techniques for implementing virtual platforms within a network, and, in particular embodiments, to methods, systems, apparatuses, and computer software for implementing virtual platform media access control ("MAC") address—based layer 2 and layer 3 network switching.

In various embodiments, a method might comprise receiving, at a network node in a network, a data packet having a header comprising a MAC origination address, a MAC destination address, and optionally an IP address, then routing, steering, and/or forwarding, with the network node, the data packet over open systems interconnection ("OSI") model layer 3 or network layer of the network, based at least in part on at least one of the MAC origination address and the MAC destination address in the header of the data packet. Each of the MAC origination address and the MAC destination address comprises a first portion comprising an organizationally unique identifier ("OUI") and a second portion comprising an identifier for a destination network interface controller ("NIC") and/or a destination virtual NIC ("VNIC"), which might be associated either with a first service provider associated with the network node or the network or with a second service provider, content service provider, and/or application service provider that is different or separate from the first service provider.

In some embodiments, Intent-based routing commands may use the OUI-based routing "intent" as a specific policy for packet forwarding in software defined network ("SDN") controllers, and for packet forwarding in Open Flow and other exteriorly controlled forwarding plane control engines in a bearer plane element. Intent-based services orchestration is described in greater detail in U.S. patent application Ser. No. 14/983,884 (the "'884 application"), filed Dec. 30, 2015 by Kevin M. McBride et al., entitled, "Intent-Based Services Orchestration," which claims priority to U.S. Patent Application Ser. No. 62/233,911 (the "'911 application"), filed Sep. 28, 2015 by Kevin M. McBride et al., entitled, "Intent-Based Services Orchestration" and U.S. Patent Application Ser. No. 62/247,294 (the "'294 application"), filed Oct. 28, 2015 by Kevin M. McBride et al., entitled, "Intent-Based Services Orchestration," the disclosure of each of which is incorporated herein by reference in their entirety for all purposes.

According to some embodiments, packet inspection functions, including, but not limited to, deep packet inspection ("DPI"), Internet Protocol detail record ("IPDR), and/or other packet inspection methodologies, or the like, may sort and/or track frames based on the OUI portion of the MAC and/or IPv6 frame.

In some cases, packet flow analysis implementations—which may comprise any netflow traffic analysis, including, without limitation, Jflow, Cflow, or the like—may use the OUI headers to track flow analysis and present summary statistics.

In some instances, the OUI header may be associated with content-centric networking ("CCN") at the application content level/digital rights management ("DRM") level. Historically, all applications use a layer 3 ("L3") user datagram protocol ("UDP") and/or transmission control protocol ("TCP") port. In embodiments where a virtual port may be created with the "application" OUI in the layer 2 ("L2")/L3 header, the application L3 and/or L2 OUI switching and/or routing capability may enable CCN without modification to the core network.

This concept enables forwarding plane rules and policies for L3 to L3, L3 to/from L2, and L2 to L2 to be created based upon the specific "OUI" numbers, ranges, and other schema that enhance routing based upon the organizational MAC address. Although the detailed description below refers to L2 to L3 examples, the various embodiments are not so limited and are applicable to all OUI-based routing and switching implementations (whether L3 to L3, L3 to L2, L2 to L2, or L2 to L3).

In some embodiments, routing the data packet over OSI model layer 3 or network layer of the network, based at least in part on the MAC destination address in the header of the data packet, might comprise one of steering or forwarding, with a SDN controller in the network node, the data packet over OSI model layer 3 or network layer of the network, based at least in part on the MAC destination address in the header of the data packet.

In some instances, the network node might receive both the data packet and a data frame, each of which has a header comprising a MAC destination address (which might be the same MAC destination address or a different MAC destination address), and might route, steer, and/or forward the data packet over layer 3 (i.e., the network layer) of the network based at least in part on the MAC destination address in the header of the data packet, while also routing, steering, and/or forwarding the data frame over layer 2 (i.e., the data link layer) of the network based at least in part on the MAC destination address in the header of the data frame.

In some cases, the network might be one or more networks associated with the same network service provider. Alternatively, the network might be a collection of networks associated with multiple network service providers. For example, the network might be one or more first networks associated with a first network service provider, one or more second networks associated with a second network service provider, and so on. Each network might include, without limitation, one or more of a local area network ("LAN"), a wide area network ("WAN"), a wireless wide area network ("WWAN"), a virtual private network ("VPN"), the Internet, or an extranet, and/or the like. In some instances, the network node might include, but is not limited to, one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

According to some embodiments, specific applications may be deployed with one set of MAC OUI's associated with a service provider, and the network (i.e., each of multiple network nodes in the network) steers traffic accordingly (over layer 3, and in some cases, over layer 2 as well). In some cases, a service provider may utilize multiple different OUI's for different purposes; for example, one OUI may be used for Infrastructure as a Service ("IaaS") functionalities and service options, while a different OUI may be used for applications, virtual network functions ("VNFs"), and/or the like to apply bandwidth limitations and/or to achieve desired quality of service ("QoS"). Alternatively, or additionally, third parties might use the service provider's OUI's in virtual machines on the third party networks, which would allow the service provider to holistically route traffic anywhere (i.e., in the third party networks), even outside the service provider's own network.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network technology, network communications technology, data packet routing/steering/forwarding technology, and/or the like. In other aspects, certain embodiments, can improve the functioning of user equipment or systems themselves (e.g., telecommunications equipment, network components, etc.), for example, by providing MAC addressed-based routing, steering, and/or forwarding of data packets over layer 3 (i.e., the network layer, which traditionally is governed by IP protocol-based routing, steering, and/or forwarding) of one or more networks, which allows for functionalities tied to a service provider associated with the OUI in the MAC address, and/or the like. In particular, to the extent any abstract concepts are present in the various embodiments, those concepts can be implemented as described herein by devices, software, systems, and methods that involve specific novel functionality (e.g., steps or operations), such as enabling routing, steering, and/or forwarding of data packets over layer 3, enabling filtering based on OUI's in MAC addresses for different functionalities (e.g., IaaS, applications, VNFs, applying bandwidth limitations, maintaining QoS, etc.), and enabling routing of traffic over layer 3 over other networks (i.e., third party networks) when third parties use OUI's of the service provider, to name a few examples, that extend beyond mere conventional computer processing operations. These functionalities can produce tangible results outside of the implementing computer system, including, merely by way of example, allowing routing, steering, and/or forwarding of data packets over layer 3, allowing filtering based on OUI's in MAC addresses for different functionalities (e.g., IaaS, applications, VNFs, applying bandwidth limitations, maintaining QoS, etc.), and allowing routing of traffic over layer 3 over other networks (i.e., third party networks) when third parties use OUI's of the service provider, which may be observed or measured by customers and/or service providers.

In an aspect, a method might comprise receiving, at a network node in a network, a data packet having a header comprising a media access control ("MAC") destination address. The method might further comprise routing, with the network node, the data packet over open systems interconnection ("OSI") model layer 3 or network layer of the network, based at least in part on the MAC destination address in the header of the data packet.

In some embodiments, the MAC destination address might comprise a first portion comprising an organizationally unique identifier ("OUI") and a second portion comprising an identifier for one of a destination network interface controller ("NIC") or a destination virtual NIC ("VNIC"). In some instances, the OUI might be associated with a service provider associated with the one of the destination NIC or the destination VNIC, and the network node and the network might each be associated with the service provider that is associated with the one of the destination NIC or the destination VNIC. Alternatively, the OUI might be associated with a service provider associated with the one of the destination NIC or the destination VNIC, and the network node and the network might each be associated with a second service provider that is different from the service provider that is associated with the one of the destination NIC or the destination VNIC. In yet another alternative, the OUI might be associated with at least one of an application service provider or a content service provider, each of which is different from a service provider associated with the one of the destination NIC or the destination VNIC.

According to some embodiments, routing the data packet over OSI model layer 3 or network layer of the network, based at least in part on the MAC destination address in the header of the data packet, might comprise one of steering or forwarding, with a software defined network ("SDN") controller in the network node, the data packet over OSI model layer 3 or network layer of the network, based at least in part on the MAC destination address in the header of the data packet.

In some cases, the method might further comprise receiving, at the network node, a data frame having a header comprising a second MAC destination address that is the same as the MAC destination address in the header of the data packet, and routing, with the network node, the data frame over OSI model layer 2 or data link layer of the network, based at least in part on the same MAC destination address in the header of the data frame.

Merely by way of example, in some embodiments, the network might comprise one or more of a local area network ("LAN"), a wide area network ("WAN"), a wireless wide area network ("WWAN"), a virtual private network ("VPN"), the Internet, or an extranet, and/or the like. In some instances, the network node might comprise one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

In another aspect, a network node might be provided in a network. The network node might comprise at least one processor and a non-transitory computer readable medium communicatively coupled to the at least one processor. The non-transitory computer readable medium might have stored thereon computer software comprising a set of instructions that, when executed by the at least one processor, causes the network node to receive a data packet having a header comprising a media access control ("MAC") destination address and to route the data packet over open systems interconnection ("OSI") model layer 3 or network layer of each of the network, based at least in part on the MAC destination address in the header of the data packet.

In some embodiments, the MAC destination address might comprise a first portion comprising an organizationally unique identifier ("OUI") and a second portion comprising an identifier for one of a destination network interface controller ("NIC") or a destination virtual NIC ("VNIC"). In some instances, the OUI might be associated with a service provider associated with the one of the destination NIC or the destination VNIC, and the network node and the network might each be associated with the service provider that is associated with the one of the destination NIC or the destination VNIC. Alternatively, the OUI might be associated with a service provider associated with the one of the destination NIC or the destination VNIC, and the network node and the network might each be associated with a second service provider that is different from the service provider that is associated with the one of the destination NIC or the destination VNIC. In yet another alternative, the OUI might be associated with at least one of an application service provider or a content service provider, each of which is different from a service provider associated with the one of the destination NIC or the destination VNIC.

According to some embodiments, routing the data packet over OSI model layer 3 or network layer of the network, based at least in part on the MAC destination address in the header of the data packet, might comprise one of steering or forwarding, with a software defined network ("SDN") controller in the network node, the data packet over OSI model layer 3 or network layer of the network, based at least in part on the MAC destination address in the header of the data packet.

In some cases, the set of instructions, when executed by the at least one processor, might further cause the network node to receive a data frame having a header comprising a second MAC destination address that is the same as the MAC destination address in the header of the data packet and to route the data frame over OSI model layer 2 or data link layer of the network, based at least in part on the same MAC destination address in the header of the data frame.

Merely by way of example, in some embodiments, the network might comprise one or more of a local area network ("LAN"), a wide area network ("WAN"), a wireless wide area network ("WWAN"), a virtual private network ("VPN"), the Internet, or an extranet, and/or the like. In some instances, the network node might comprise one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

In yet another aspect, a system might comprise one of a destination network interface controller ("NIC") or a destination virtual NIC ("VNIC") in a first network and a network node in a second network. The network node might comprise at least one processor and a non-transitory computer readable medium communicatively coupled to the at least one processor. The non-transitory computer readable medium might have stored thereon computer software comprising a set of instructions that, when executed by the at least one processor, causes the network node to receive a data packet having a header comprising a media access control ("MAC") destination address and to route the data packet over open systems interconnection ("OSI") model layer 3 or network layer of at least one of the first network or the second network, based at least in part on the MAC destination address in the header of the data packet.

In some embodiments, the MAC destination address might comprise a first portion comprising an organizationally unique identifier ("OUI") and a second portion comprising an identifier for the one of the destination NIC or the destination VNIC. In some instances, the OUI might be associated with a service provider associated with the one of the destination NIC or the destination VNIC, the first network and the second network might be the same network, and the network node and the second network might each be associated with the service provider that is associated with the one of the destination NIC or the destination VNIC. Alternatively, the OUI might be associated with a service provider associated with the one of the destination NIC or the destination VNIC, the first network might be different from the second network, and the network node and the second network might each be associated with a second service provider that is different from the service provider that is associated with the one of the destination NIC or the destination VNIC. In yet another alternative, the OUI might be associated with at least one of an application service provider or a content service provider, each of which is different from a service provider associated with the one of the destination NIC or the destination VNIC.

According to some embodiments, routing the data packet over OSI model layer 3 or network layer of the at least one of the first network or the second network, based at least in part on the MAC destination address in the header of the data packet, might comprise one of steering or forwarding, with a software defined network ("SDN") controller in the network node, the data packet over OSI model layer 3 or network layer of the at least one of the first network or the second network, based at least in part on the MAC destination address in the header of the data packet.

In some cases, the set of instructions, when executed by the at least one processor, might further cause the network node to receive a data frame having a header comprising a second MAC destination address that is the same as the MAC destination address in the header of the data packet and to route the data frame over OSI model layer 2 or data link layer of at least one of the first network or the second network, based at least in part on the same MAC destination address in the header of the data frame.

Merely by way of example, in some embodiments, the the first network and the second network might each comprise one or more of a local area network ("LAN"), a wide area network ("WAN"), a wireless wide area network ("WWAN"), a virtual private network ("VPN"), the Internet, or an extranet, and/or the like. In some instances, the network node might comprise one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing virtual platforms within a network, and, in particular embodiments, to methods, systems, apparatuses, and computer software for implementing virtual platform media access control ("MAC") address—based layer 2 and layer 3 network switching, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Figure 1B:
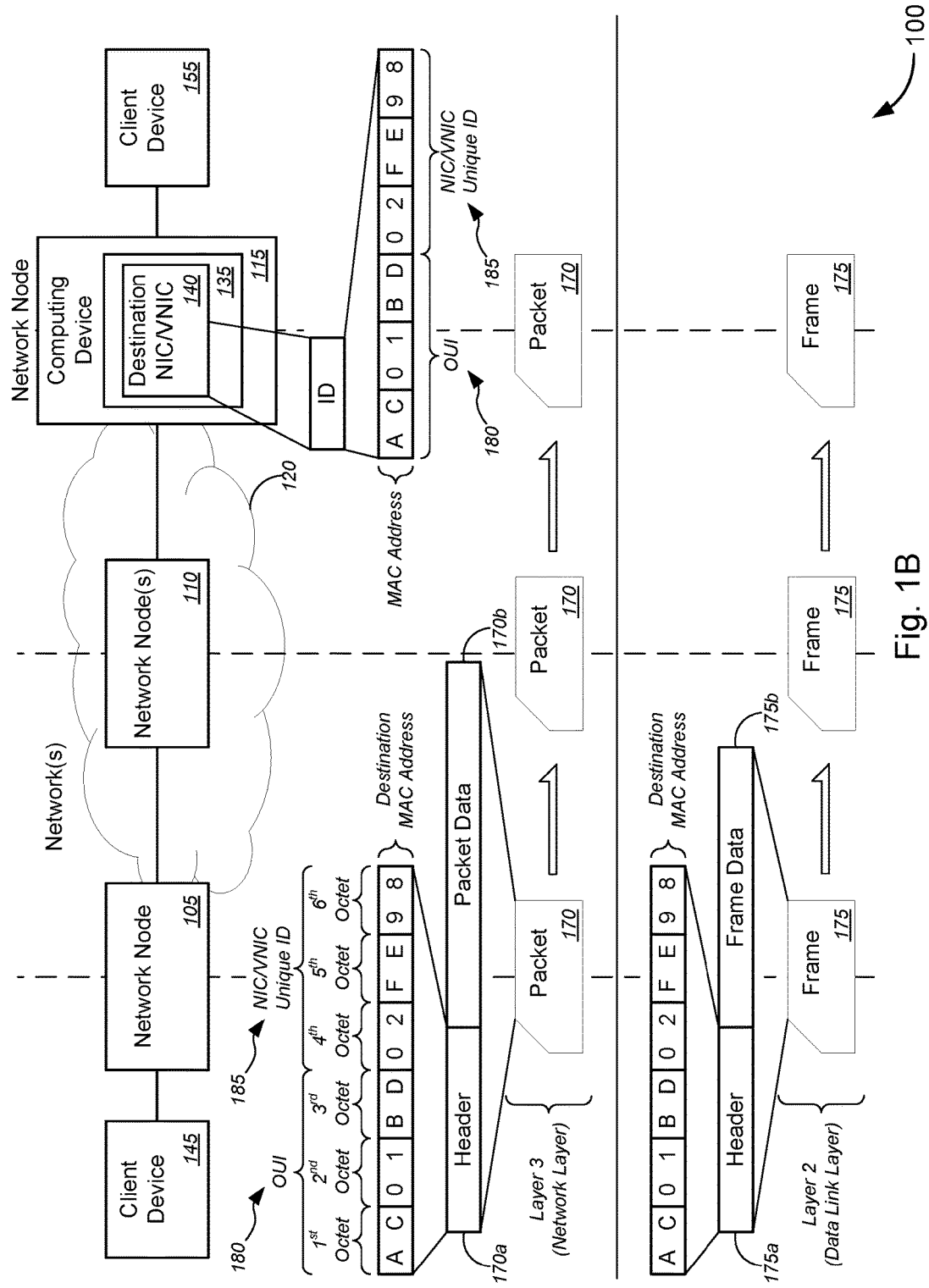

With reference to the figures, FIGS. 1A and 1B (collectively, "FIG. 1") are schematic diagrams illustrating a system 100 for implementing virtual platform media access control ("MAC") address—based layer 2 and layer 3 network switching, in accordance with various embodiments. FIG. 1A depicts an embodiment of a network and interconnections amongst network nodes and client devices via the network, while FIG. 1B depicts an embodiment of MAC Address-based routing, steering, and/or forwarding of data packets over layer 3 (i.e., the network layer) and MAC Address-based routing, steering, and/or forwarding of data frames over layer 2 (i.e., the data link layer), at each of the network nodes in the network (as indicated by the long-dash vertical lines that show the data packet or data frame at the network node position as the data packet or data frame is routed, steered, and/or forwarded from client device 145 toward client device 155 via network nodes 105, 110, and 115).

Turning to FIG. 1A, system 100 might include, without limitation, one or more first network nodes 105a-105n (collectively, "first network nodes 105" or network nodes 105"), one or more intermediary network nodes 110, one or more second network nodes 115a-115n (collectively, "second network nodes 115" or network nodes 115"), and one or more first networks 120. Some or all of the first network nodes 105 might each comprise a computing device 125, which might comprise one or more network interface cards ("NICs") or might host one or more virtual NICs ("VNICs") 130. Although FIG. 1A shows only network node 105a comprising the computing device 125 and the NIC/VNIC 130, some or all of the other network nodes 105b-105n might each likewise comprise a similar computing device 125 and/or a similar NIC/VNIC 130.

In some cases, the one or more VNICs 130 might be hosted within a container (not shown) in the computing device 125, and, in some embodiments, might be embodied as a virtual network function ("VNF") module, a VNF component, a VNF instance, and/or the like. Load sharing and schedule of multiple VNICs are described in greater detail in U.S. patent application Ser. No. 14/583,952 (the "'952 application"), filed Dec. 29, 2014 by Michael K. Bugenhagen, entitled, "Multi-line/Multi-state Virtualized OAM Transponder," which claims priority to U.S. Patent Application Ser. No. 62/038,201 (the "'201 application"), filed Aug. 15, 2014 by Michael K. Bugenhagen, entitled, "Multi-line/Multi-state Virtualized OAM Transponder," the disclosures of each of which are incorporated herein by reference in their entirety for all purposes.

Similarly, some or all of the second network nodes 115 might each comprise a computing device 135, which might comprise one or more (physical) NICs 140 or might host one or more VNICs 140. Although FIG. 1A shows only network node 115a comprising the computing device 135 and the NIC/VNIC 140, some or all of the other network nodes 115b-115n might each likewise comprise a similar computing device (in this case, computing device 135) and/or a similar NIC/VNIC (in this case, NIC/VNIC 140). Likewise, although not shown, some or all of the intermediary network nodes 110 might each comprise a similar computing device and/or a similar NIC/VNIC. Merely by way of example, in some embodiments, the network(s) 120 might include, without limitation, one or more of a local area network ("LAN"), a wide area network ("WAN"), a wireless wide area network ("WWAN"), a virtual private network ("VPN"), the Internet, or an extranet, and/or the like. In some instances, the network nodes 105, 110, and 115 might each include, but is not limited to, one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

System 100 might further comprise one or more client devices 145a-145n (collectively, "client devices 145") that are communicatively coupled to one of the first network nodes 105a, one or more client devices 150a-150n (collectively, "client devices 150") that are communicatively coupled to one of the first network nodes 105n, one or more client devices 155a-155n (collectively, "client devices 155") that are communicatively coupled to one of the second network nodes 115a, and one or more client devices 160a-160n (collectively, "client devices 160") that are communicatively coupled to one of the second network nodes 115n, and/or the like.

In the non-limiting embodiment of FIG. 1A, network node 105a might receive a data packet 170 (in some instances, from one of the client devices 145; in other cases, from other portions of network(s) 120; and/or the like), and might route, steer, and/or forward the data packet 170 over layer 3 (i.e., the network layer) of the network(s) 120 based at least in part on a destination MAC address (in this case, the MAC address of network node 115a) that is listed in a header of the data packet 170. FIG. 1B illustrates this MAC address-based routing, steering, and/or forwarding of the data packet in greater detail, and is described below. As network node 105a routes, steers, and/or forwards the data packet 170 toward the destination NIC/VNIC, one or more of the intermediary network nodes 110 each receives and in turn routes, steers, and/or forwards the data packet 170 over layer 3 toward the destination NIC/VNIC (in this case, NIC/VNIC 140 of network node 115a) based at least in part on the destination MAC address, until the data packet 170 is received by the destination NIC/VNIC (i.e., NIC/VNIC 140 of network node 115a). The data packet 170 is subsequently routed, steered, and/or forwarded to one or more destination client devices (in this case, one or more of client devices 155a-155n) that are communicatively coupled to the destination NIC/VNIC (in this case, NIC/VNIC 140 of network node 115a), based at least in part on other identifiers in the header of the data packet.

Similarly, network node 105n might receive a data frame 175, and might route, steer, and/or forward the data frame 175 over layer 2 (i.e., the data link layer) of the network(s) 120 based at least in part on a destination MAC address (in this case, the MAC address of network node 115n) that is listed in a header of the data frame 175. FIG. 1B also illustrates this MAC address-based routing, steering, and/or forwarding of the data frame in greater detail, in comparison to the MAC address-based routing, steering, and/or forwarding of the data packet. As network node 105n routes, steers, and/or forwards the data frame 175 toward the destination NIC/VNIC, one or more of the intermediary network nodes 110 each receives and in turn routes, steers, and/or forwards the data frame 175 over layer 2 toward the destination NIC/VNIC (in this case, NIC/VNIC 140 (not shown) of network node 115n) based at least in part on the destination MAC address, until the data frame 175 is received by the destination NIC/VNIC (i.e., NIC/VNIC 140 (not shown) of network node 115n). The data frame 175 is subsequently routed, steered, and/or forwarded to one or more destination client devices (in this case, one or more of client devices 160a-160n) that are communicatively coupled to the destination NIC/VNIC (in this case, NIC/VNIC 140 (not shown) of network node 115n), based at least in part on other identifiers in the header of the data packet.

Importantly, in the non-limiting embodiment of system 100, at least one of the intermediary network nodes 110 routes, steers, and/or forwards the data packet 170 over layer 3 and the data frame 175 over layer 2, based at least in part on the MAC addresses of the destination NICs/VNICs that are listed in each of the data packet 170 and the data frame 175. This allows, in some embodiments, for content-centric networking. For example, if a content service provider or application service provider has its own OUI, the destination MAC address with such OUI would enable routing, steering, and/or forwarding of a data packet toward a NIC or VNIC with the destination MAC address even across multiple networks that might be associated with multiple network service providers. The use of such MAC address-based routing (with specific OUI of the content or application service provider being used universally for routing across the multiple networks) over layer 3 of the network(s) also avoids any conflicts that might arise with the conventional layer 3 IP-based routing that drops to layer 2 MAC-based routing where the multiple networks at layer 2 might potentially have the same MAC address, thereby causing network routing issues.

In some embodiments, Intent-based routing commands may use the OUI-based routing "intent" as a specific policy for packet forwarding in software defined network ("SDN") controllers, and for packet forwarding in Open Flow and other exteriorly controlled forwarding plane control engines in a bearer plane element. Intent-based services orchestration is described in greater detail in the '884 application, which has already been incorporated herein by reference in its entirety.

According to some embodiments, packet inspection functions, including, but not limited to, deep packet inspection ("DPI"), Internet Protocol detail record ("IPDR), and/or other packet inspection methodologies, or the like, may sort and/or track frames based on the OUI portion of the MAC and/or IPv6 frame. In some cases, packet flow analysis implementations—which may comprise any netflow traffic analysis, including, without limitation, Jflow, Cflow, or the like—may use the OUI headers to track flow analysis and present summary statistics.

In some instances, the OUI header may be associated with content-centric networking ("CCN") at the application content level/digital rights management ("DRM") level. Historically, all applications use a L3 user datagram protocol ("UDP") and/or transmission control protocol ("TCP") port. In embodiments where a virtual port may be created with the "application" OUI in the L2/L3 header, the application L3 and/or L2 OUI switching and/or routing capability may enable CCN without modification to the core network.

We now turn to FIG. 1B, which shows at a top portion thereof a simplified system view, with one client device 145 (representing one or more sending client devices 145 or 150), one first network node 105 (representing one or more first network nodes 105a-105n), one intermediary network node 110 (representing one or more intermediary network nodes 110), one second network node 115 (representing one or more second network nodes 115a-115n), and one client device 155 (representing one or more destination client devices 155 or 160). Although only network node 115 is shown having computing device 135 and/or NIC/VNIC 140, the various embodiments are not so limited, and some or all of the other network nodes (i.e., network node 105 and/or one or more of network node(s) 110) might comprise similar computing device and/or similar NICs/VNICs. As shown in FIG. 1B, network(s) 120, which might be one or more networks each associated with a single network service provider, might span network nodes 105, 110, and 115. As mentioned above, the long-dash lines extending vertically from each of the network nodes 105, 110, and 115 represents that the MAC address-based routing, steering, and/or forwarding of the data packet 170 (over layer 3) and the data frame 175 (over layer 2) occurs at each of these network nodes.

In the embodiment of FIG. 1B, network node 105 might receive data packet 170, which might comprise a header portion 170a and a packet data portion 170b. At least a portion of the header 170a might comprise a destination MAC address. As shown in FIG. 1B, the destination NIC/VNIC 140 might have an identifier, at least a portion of which might list a MAC address (which, in this case, is the same as the destination MAC address as listed in the header portion 170a of the data packet 170). The MAC address comprises an organizationally unique identifier ("OUI") 180 and a (universally) unique identifier ("UID") for the destination NIC/VNIC 185. The OUI 180 is an identifier that is issued by the Institute of Electrical and Electronics Engineers, Incorporated ("IEEE"), and is associated with a vendor, manufacturer, or other organization. In some cases, a vendor, manufacturer, or other organization might acquire multiple OUIs from the IEEE for various technical and/or business reasons. The NIC/VNIC UID, in some cases, is a serial number associated with the NIC or VNIC. For physical NICs, the MAC address is most often assigned by the manufacturer of the NIC and is stored in its hardware (either in the NICs read-only memory or some other firmware mechanism). For VNICs, which are dynamically created by an orchestrator, hypervisor, or host operating system ("OS"), a (virtual) MAC address is created at the time of the VNIC's creation (which might sometimes coincide with creation of a virtual machine ("VM") or the like), and typically follows the abovementioned ID or notation convention for physical NICs, except that the manufacturer OUI is replaced by the OUI of the service provider (i.e., the vendor, manufacturer, or other organization) that is associated with the orchestrator that created the VNIC or a service provider who would like its services associated with a particular OUI and is a customer of the service provider (i.e., the vendor, manufacturer, or other organization) that is associated with the orchestrator that created the VNIC. Each network interface card (whether NIC or VNIC) must have a unique MAC address, and this remains true even if some NICs (i.e., VNICs) are virtual rather than physical. Because the MAC address of the MAC address-based routing, steering, and/or forwarding of data packets over layer 3 might span multiple networks (including networks that are associated with two or more different network service providers), a single OUI can be used and all UIDs of NICs/VNICs associated with that one OUI must be universally unique.

The destination MAC address in the embodiment of FIG. 1B comprises in the first through third octets an example OUI—in this case, "AC-01-BD" (which is a hexadecimal representation of an OUI that is represented with the most significant digits at the beginning and the least significant digits at the end), which is equivalent to "35:80:BD" when represented in the bit-reversed representation. The destination MAC address in FIG. 1B further comprises in the fourth through sixth octets an example UID of the destination NIC/VNIC—i.e., "02-FE-98" (which is a hexadecimal representation of the UID), which is equivalent to "40:7F:19" when represented in the bit-reversed representation.

The network node 105 might subsequently route, steer, and/or forward the data packet 170 over layer 3 (i.e., the network layer) of the network(s) 120, based at least in part on the MAC destination address in the header 170*a* of the data packet 170. In a similar manner, each network node 110 might receive the data packet 170, and might route, steer, and/or forward the data packet 170 over layer 3 (i.e., the network layer) of the network(s) 120, based at least in part on the MAC destination address in the header 170*a* of the data packet 170. Eventually, the network node 115 might receive the data packet 170, and might determine that the destination MAC Address in the header 170*a* of the data packet 170 matches the MAC address of a NIC or VNIC 140 that is comprised or hosted in a computing device 135 of the network node 115. Based on this determination, the network node 115 might determine which one or more client devices 155 to which the network node 115 is communicatively coupled (either wirelessly or via wired connection) is an intended recipient of the data packet 170, in some cases, based at least in part on other identifiers (not shown) in the header 170*a* of the data packet 170.

In some aspects, the routing, steering, and/or forwarding of the data packet 170 over layer 3 (i.e., the network layer) of the network(s) 120 might comprise either steering and/or forwarding, with a software defined network ("SDN") controller (not shown) in the particular network node(s), the data packet 170 over layer 3 of the network(s) 120, based at least in part on the MAC destination address in the header 170*a* of the data packet 170. In such embodiments, the SDN controller(s) might essentially use a "filter" (i.e., the MAC destination address) as a method for forwarding and/or steering the data packet over layer 3 of the network(s) 120.

According to some embodiments, apart from the routing, steering, and/or forwarding of the data packet 170 over layer 3 (i.e., the network layer) of the network(s) 120, each of the abovementioned network nodes might also route, steer, and/or forward data frames 175 over layer 2 (i.e., the data link layer) of the network(s) 120. In the particular example in FIG. 1B, for instance, network node 105 might receive data frame 175, which might comprise a header portion 175*a* and a frame data portion 175*b*. At least a portion of the header 175*a* might comprise a destination MAC address, which for purposes of illustration is the same as the destination MAC address in header 170*a* of data packet 170. As above, network node 105 might subsequently route, steer, and/or forward the data frame 175 over layer 2 (i.e., the data link layer) of the network(s) 120, based at least in part on the MAC destination address in the header 175*a* of the data frame 175. In a similar manner, each network node 110 might receive the data frame 175, and might route, steer, and/or forward the data frame 175 over layer 2 (i.e., the data link layer) of the network(s) 120, based at least in part on the MAC destination address in the header 175*a* of the data frame 175. Eventually, the network node 115 might receive the data frame 175, and might determine that the destination MAC Address in the header 175*a* of the data frame 175 matches the MAC address of a NIC or VNIC 140 that is comprised or hosted in a computing device 135 of the network node 115. Based on this determination, the network node 115 might determine which one or more client devices 155 to which the network node 115 is communicatively coupled (either wirelessly or via wired connection) is an intended recipient of the data frame 175, in some cases, based at least in part on other identifiers (not shown) in the header 175*a* of the data frame 175.

Figure 2:
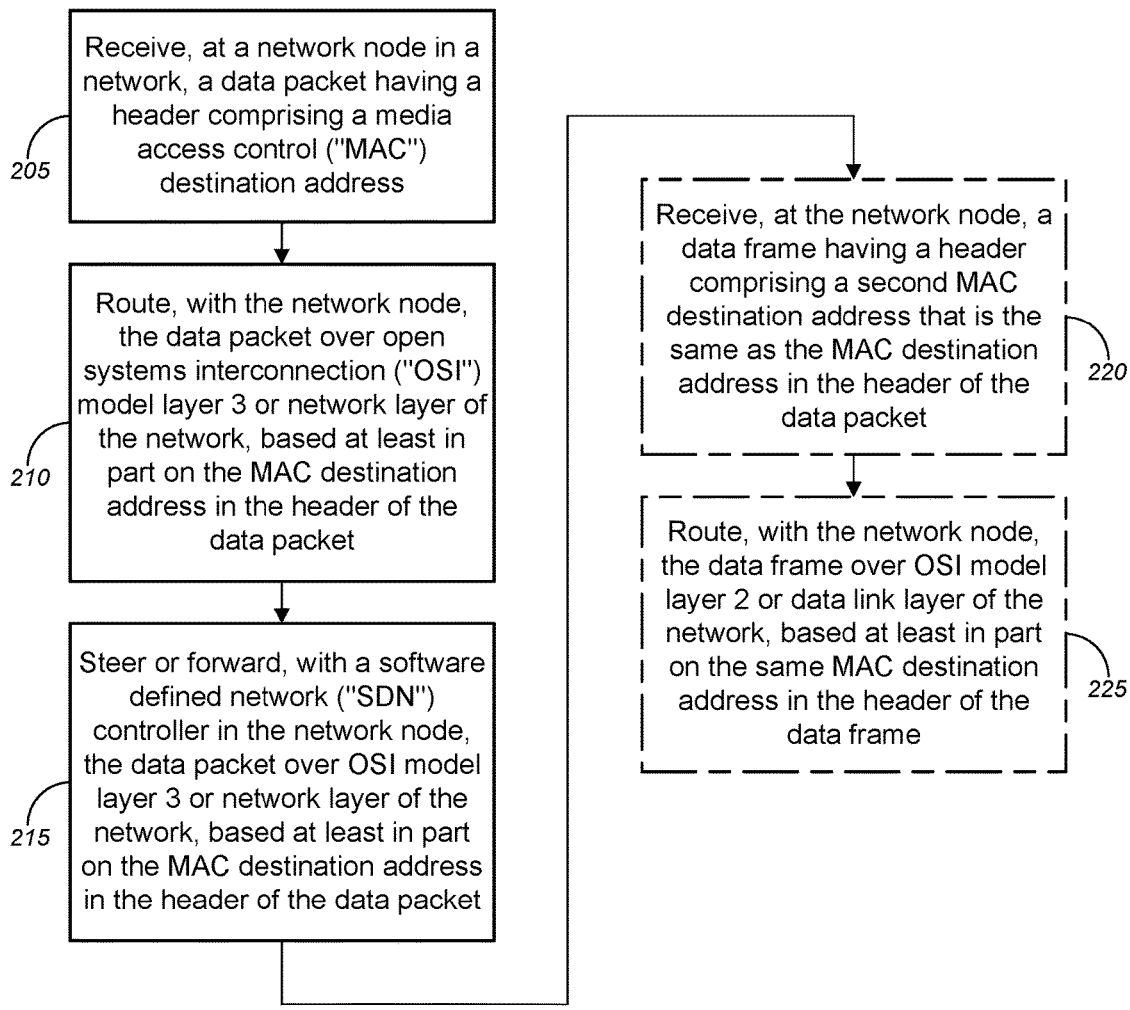
FIG. 2 is a flow diagram illustrating a method for implementing virtual platform MAC address—based layer 2 and layer 3 network switching, in accordance with various embodiments.

FIG. 2 is a flow diagram illustrating a method 200 for implementing virtual platform MAC address—based layer 2 and layer 3 network switching, in accordance with various embodiments. While the techniques and procedures are depicted and/or described in a certain order for purposes of illustration, it should be appreciated that certain procedures may be reordered and/or omitted within the scope of various embodiments. Moreover, while the method 2 illustrated by FIG. 2 can be implemented by or with (and, in some cases, are described below with respect to) the system 100 of FIG. 1 (or components thereof), such methods may also be implemented using any suitable hardware (or software) implementation. Similarly, while the system 100 of FIG. 1 (or components thereof) can operate according to the method 200 illustrated by FIG. 2 (e.g., by executing instructions embodied on a computer readable medium), the system 100 of FIG. 1 can each also operate according to other modes of operation and/or perform other suitable procedures.

With reference to FIG. 2, method 200 might comprise, at block 205, receiving, at a network node in a network, a data packet having a header comprising a media access control ("MAC") destination address. The MAC destination address might comprise a first portion comprising an organizationally unique identifier ("OUI") and a second portion comprising an identifier for one of a destination network interface controller ("NIC") or a destination virtual NIC ("VNIC"). In some embodiments, the OUI might be associated with a service provider associated with the one of the destination NIC or the destination VNIC, and the network node and the network might each be associated with the service provider that is associated with the one of the destination NIC or the destination VNIC. In alternative embodiments, the OUI might be associated with a service provider associated with the one of the destination NIC or the destination VNIC, and the network node and the network might each be associated with a second service provider that is different from the service provider that is associated with the one of the destination NIC or the destination VNIC. In yet other embodiments, the OUI might be associated with at least one of an application service provider or a content service provider, each of which is different from a service provider associated with the one of the destination NIC or the destination VNIC.

At block 210, method 200 might comprise routing, with the network node, the data packet over open systems interconnection ("OSI") model layer 3 or network layer of the network, based at least in part on the MAC destination address in the header of the data packet. In some embodiments, routing the data packet over OSI model layer 3 or network layer of the network, based at least in part on the MAC destination address in the header of the data packet, might comprise one of steering or forwarding, with a software defined network ("SDN") controller in the network node, the data packet over OSI model layer 3 or network layer of the network, based at least in part on the MAC destination address in the header of the data packet (block 215).

Method 200, in some embodiments, might further comprise receiving, at the network node, a data frame having a header comprising a second MAC destination address that is the same as the MAC destination address in the header of the data packet (optional block 220) and routing, with the network node, the data frame over OSI model layer 2 or data link layer of the network, based at least in part on the same MAC destination address in the header of the data frame (optional block 225).

In some cases, the network might include, without limitation, one or more of a local area network ("LAN"), a wide area network ("WAN"), a wireless wide area network ("WWAN"), a virtual private network ("VPN"), the Internet, or an extranet, and/or the like. According to some embodiments, the network node might include, but is not limited to, one of a SDN controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

Figure 3A:
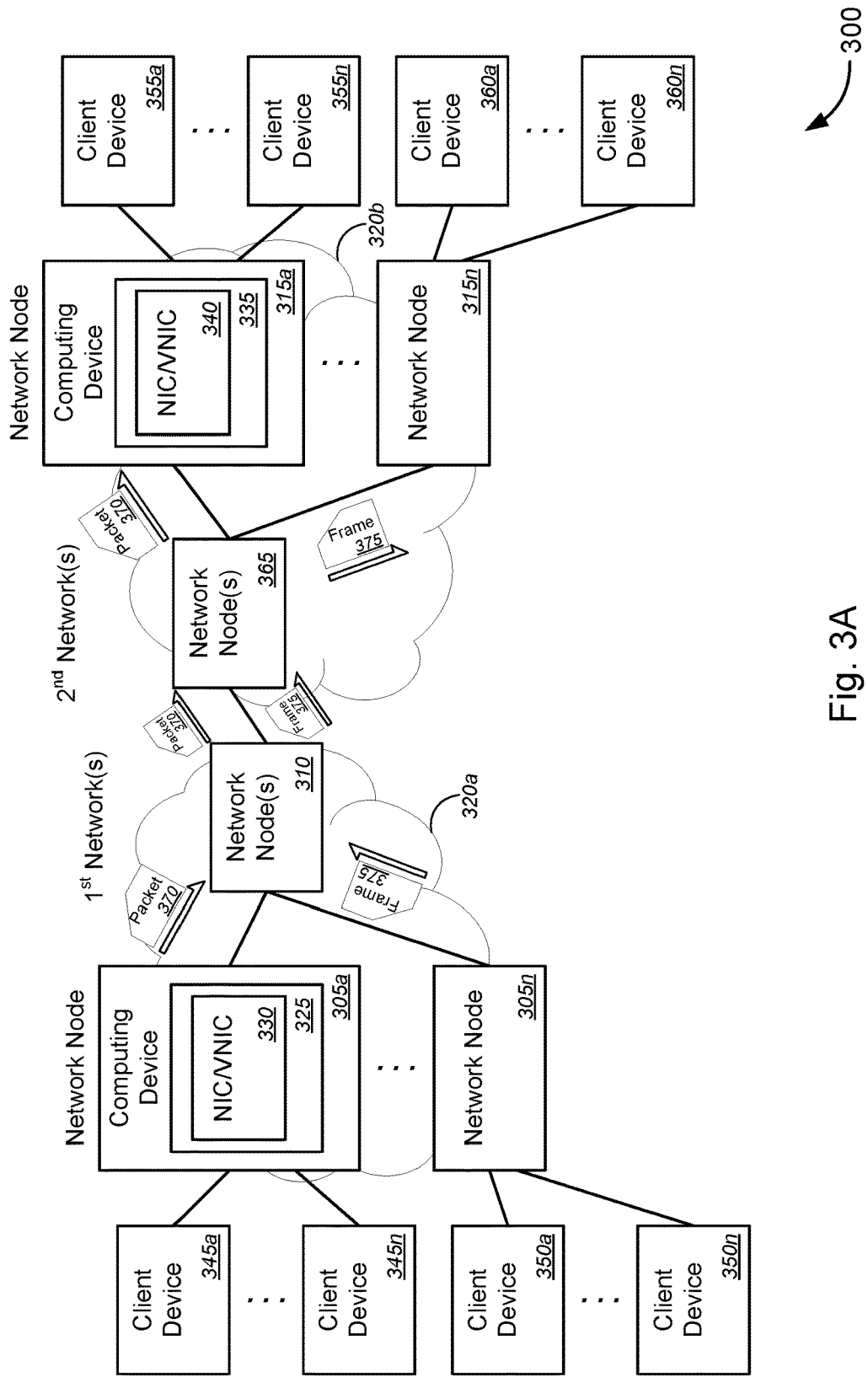
FIGS. 3A and 3B are schematic diagrams illustrating another system for implementing virtual platform MAC address—based layer 2 and layer 3 network switching, in accordance with various embodiments.
Figure 3B:
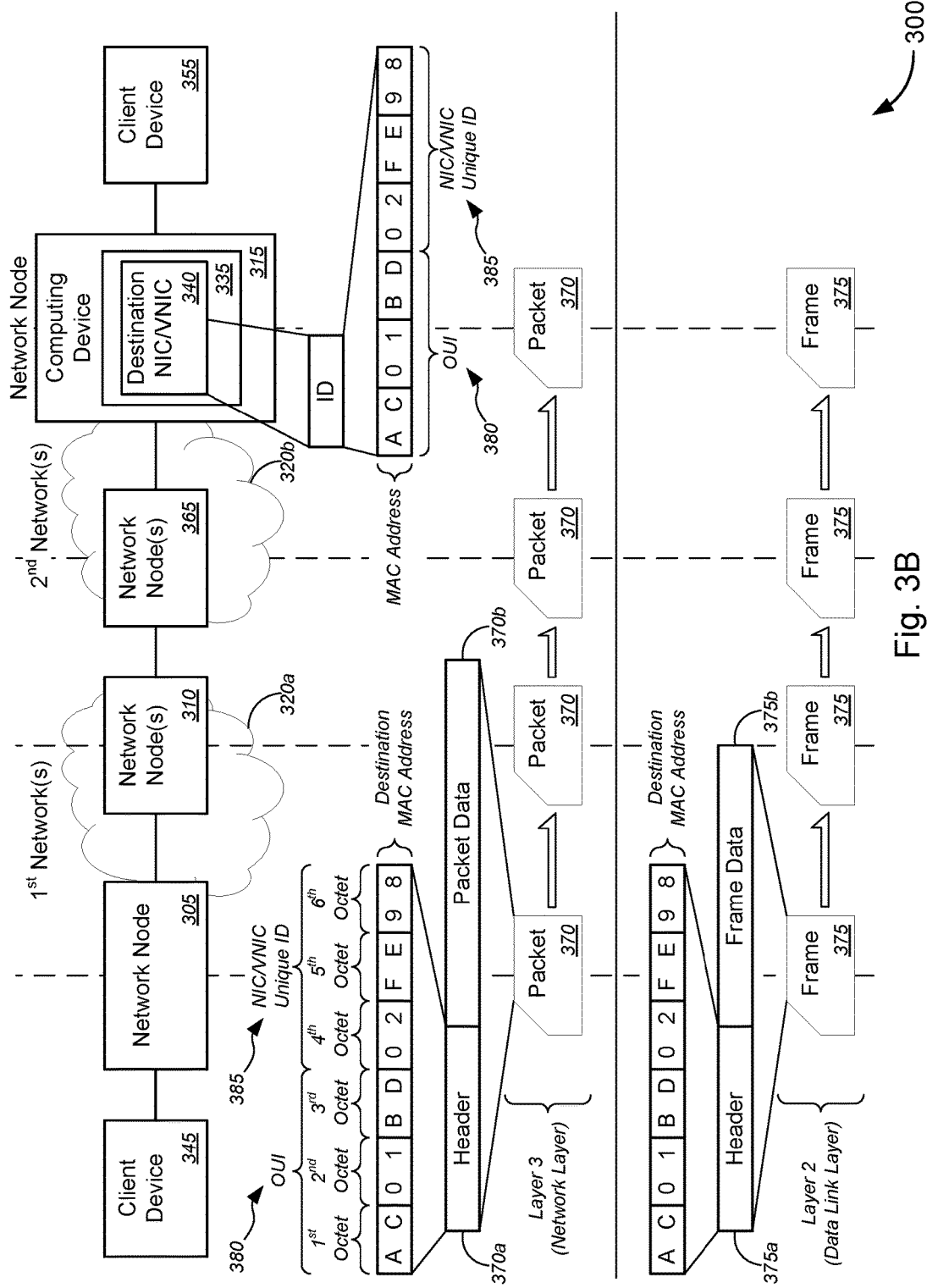
Figure 4:
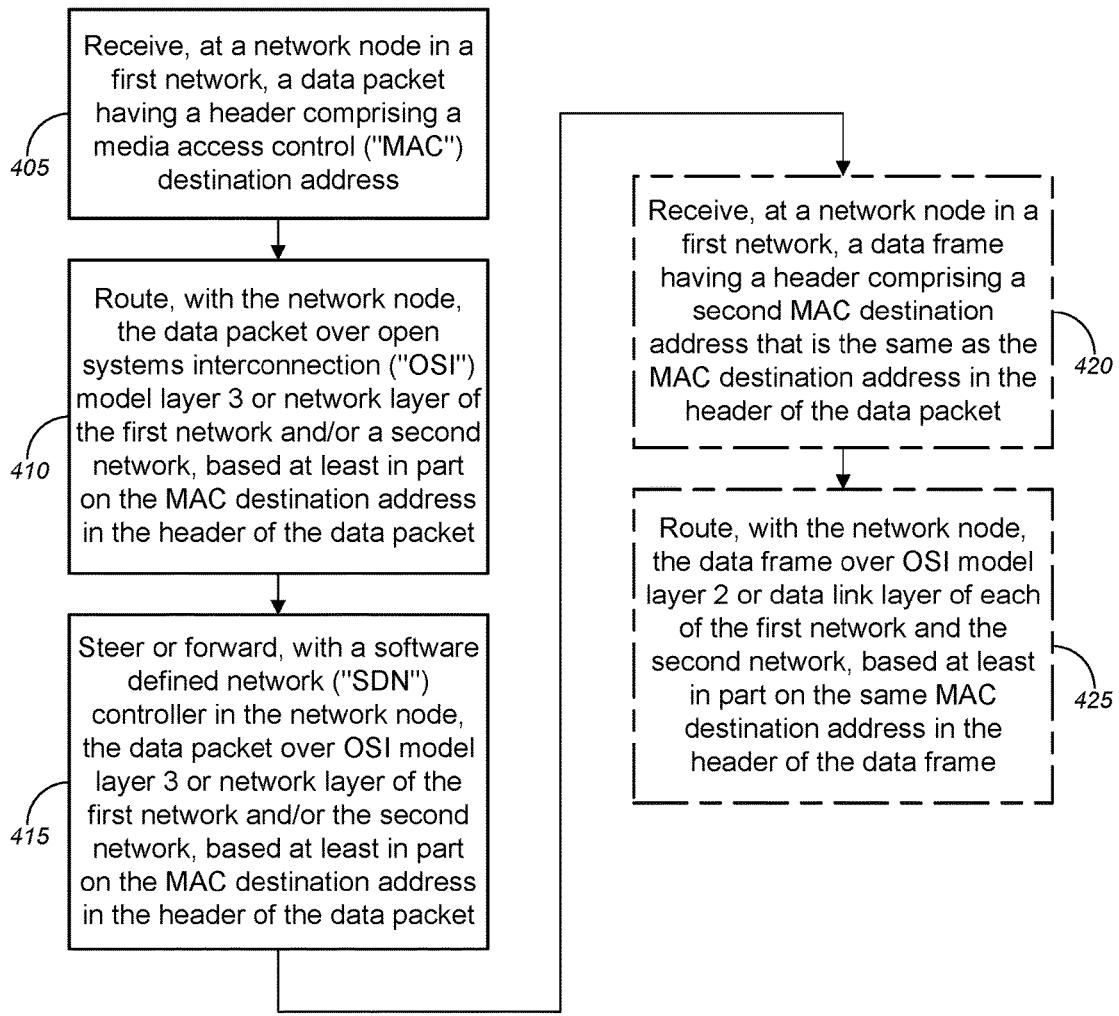
FIG. 4 is a flow diagram illustrating another method for implementing virtual platform MAC address—based layer 2 and layer 3 network switching, in accordance with various embodiments.

FIGS. 3A and 3B (collectively, "FIG. 3") are schematic diagrams illustrating another system 300 for implementing virtual platform MAC address-based layer 2 and layer 3 network switching, in accordance with various embodiments. FIG. 4 is a flow diagram illustrating another method 400 for implementing virtual platform MAC address-based layer 2 and layer 3 network switching, in accordance with various embodiments. The embodiments of FIGS. 3 and 4 are similar to those of FIGS. 1 and 2, except that the embodiments of FIGS. 3 and 4 are directed to routing, steering, and/or forwarding of data packets over level 3 (i.e., the network layer), or data frames over level 2 (i.e., the data link layer), of each of two or more networks that associated with two or more different service providers, whereas the embodiments of FIGS. 1 and 2 are directed to routing, steering, and/or forwarding of data packets over level 3 (i.e., the network layer), or data frames over level 2 (i.e., the data link layer), of a network(s) that is associated with a single service provider. Accordingly, network nodes 305a-305n, network node(s) 310 and 365, network nodes 315a-315n, network(s) 320a and 320b, computing device 325, NIC/VNIC 330, computing device 335, NIC/VNIC 340, client devices 345a-345n, 350a-350n, 355a-355n, and 360a-360n, data packet 370, and frame 375 of system 300 otherwise correspond to network nodes 105a-105n, network node(s) 110, network nodes 115a-115n, network(s) 120, computing device 125, NIC/VNIC 130, computing device 135, NIC/VNIC 140, client devices 145a-145n, 150a-150n, 155a-155n, and 160a-160n, data packet 170, and frame 175 of system 100, respectively. Similarly, processes 405-425 of method 400 otherwise correspond to processes 205-225 of method 200, respectively.

With reference to FIG. 3A, system 300 might include, without limitation, one or more first network nodes 305a-305n (collectively, "first network nodes 305" or network nodes 305"), one or more first intermediary network nodes 310, one or more second intermediary network nodes 365, one or more second network nodes 315a-315n (collectively, "second network nodes 315" or network nodes 315"), one or more first networks 320a, and one or more second networks 320b. Here, the first network(s) 320a might be associated with a first service provider, while the second network(s) 320b might be associated with a second service provider that is separate or different from the first service provider. Some or all of the first network nodes 305 might each comprise a computing device 325, which might comprise one or more network interface cards ("NICs") or might host one or more virtual NICs ("VNICs") 330. Although FIG. 3A shows only network node 305a comprising the computing device 325 and the NIC/VNIC 330, some or all of the other network nodes 305b-305n might each likewise comprise a similar computing device 325 and/or a similar NIC/VNIC 330.

In some cases, the one or more VNICs 330 might be hosted within a container (not shown) in the computing device 325, and, in some embodiments, might be embodied as a virtual network function ("VNF") module, a VNF component, a VNF instance, and/or the like. Load sharing and schedule of multiple VNICs are described in greater detail in the '952 application, which has already been incorporated herein by reference in its entirety for all purposes.

Similarly, some or all of the second network nodes 315 might each comprise a computing device 335, which might comprise one or more (physical) NICs 340 or might host one or more VNICs 340. Although FIG. 3A shows only network node 315a comprising the computing device 335 and the NIC/VNIC 340, some or all of the other network nodes 315b-315n might each likewise comprise a similar computing device (in this case, computing device 335) and/or a similar NIC/VNIC (in this case, NIC/VNIC 340). Likewise, although not shown, some or all of the intermediary network nodes 310 or 365 might each comprise a similar computing device and/or a similar NIC/VNIC. Merely by way of example, in some embodiments, the first network(s) 320a and the second network(s) 320b might each include, without limitation, one or more of a local area network ("LAN"), a wide area network ("WAN"), a wireless wide area network ("WWAN"), a virtual private network ("VPN"), the Internet, or an extranet, and/or the like. In some instances, the network nodes 305, 310, 365, and 315 might each include, but is not limited to, one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

System 300 might further comprise one or more client devices 345a-345n (collectively, "client devices 345") that are communicatively coupled to one of the first network nodes 305a, one or more client devices 350a-350n (collectively, "client devices 350") that are communicatively coupled to one of the first network nodes 305n, one or more client devices 355a-355n (collectively, "client devices 355") that are communicatively coupled to one of the second network nodes 315a, and one or more client devices 360a-360n (collectively, "client devices 360") that are communicatively coupled to one of the second network nodes 315n, and/or the like.

In the non-limiting embodiment of FIG. 3A, network node 305a might receive a data packet 370 (in some instances, from one of the client devices 345; in other cases, from other portions of the first network(s) 320a; and/or the like), and might route, steer, and/or forward the data packet 370 over layer 3 (i.e., the network layer) of the first network(s) 320a based at least in part on a destination MAC address (in this case, the MAC address of network node 315a, which is in a separate network(s) 320b) that is listed in a header of the data packet 370. FIG. 3B illustrates this MAC address-based routing, steering, and/or forwarding of the data packet in greater detail, and is described below. As network node 305a routes, steers, and/or forwards the data packet 370 toward the destination NIC/VNIC, one or more of the first intermediary network nodes 310 each receives and in turn routes, steers, and/or forwards the data packet 370 over layer 3 of the first network 320a toward the destination NIC/VNIC (in this case, NIC/VNIC 340 of network node 315a)) based at least in part on the destination MAC address. In some embodiments, one or more of the second intermediary network nodes 365 in the second network 320b might each receive and in turn route, steer, and/or forward the data packet 370 over layer 3 of the second network 320b toward the destination NIC/VNIC (in this case, NIC/VNIC 340 of network node 315a) based at least in part on the destination MAC address, until the data packet 370 is received by the destination NIC/VNIC (i.e., NIC/VNIC 340 of network node 315a). The data packet 370 is subsequently routed, steered, and/or forwarded to one or more destination client devices (in this case, one or more of client devices 355a-355n) that are communicatively coupled to the destination NIC/VNIC (in this case, NIC/VNIC 340 of network node 315a), based at least in part on other identifiers in the header of the data packet.

Similarly, network node 305n might receive a data frame 375, and might route, steer, and/or forward the data frame 375 over layer 2 (i.e., the data link layer) of the first network(s) 320a based at least in part on a destination MAC address (in this case, the MAC address of network node 315n, which is in a separate network(s) 320b) that is listed in a header of the data frame 375. FIG. 3B also illustrates this MAC address-based routing, steering, and/or forwarding of the data frame in greater detail, in comparison to the MAC address-based routing, steering, and/or forwarding of the data packet. As network node 305n routes, steers, and/or forwards the data frame 375 toward the destination NIC/VNIC, one or more of the first intermediary network nodes 310 each receives and in turn routes, steers, and/or forwards the data frame 375 over layer 2 of the first network 320a toward the destination NIC/VNIC (in this case, NIC/VNIC 340 (not shown) of network node 315n) based at least in part on the destination MAC address. In some embodiments, one or more of the second intermediary network nodes 365 in the second network 320b might each receive and in turn route, steer, and/or forward the data frame 375 over layer 2 of the second network 320b toward the destination NIC/VNIC (in this case, NIC/VNIC 340 of network node 315a) based at least in part on the destination MAC address, until the data frame 375 is received by the destination NIC/VNIC (i.e., NIC/VNIC 340 (not shown) of network node 315n). The data frame 375 is subsequently routed, steered, and/or forwarded to one or more destination client devices (in this case, one or more of client devices 360a-360n) that are communicatively coupled to the destination NIC/VNIC (in this case, NIC/VNIC 340 (not shown) of network node 315n), based at least in part on other identifiers in the header of the data packet.

Importantly, in the non-limiting embodiment of system 300, at least one of the intermediary network nodes 310 routes, steers, and/or forwards the data packet 370 over layer 3 of each of at least one of the first network 320a and the second network 320b and the data frame 375 over layer 2 of each of at least one of the first network 320a and the second network 320b, based at least in part on the MAC addresses of the destination NICs/VNICs that are listed in each of the data packet 370 and the data frame 375. This allows, in some embodiments, for content-centric networking. For example, if a content service provider or application service provider has its own OUI, the destination MAC address with such OUI would enable routing, steering, and/or forwarding of a data packet toward a NIC or VNIC with the destination MAC address even across multiple networks that might be associated with multiple network service providers. The use of such MAC address-based routing (with specific OUI of the content or application service provider being used universally for routing across the multiple networks) over layer 3 of the network(s) also avoids any conflicts that might arise with the conventional layer 3 IP-based routing that drops to layer 2 MAC-based routing where the multiple networks at layer 2 might potentially have the same MAC address, thereby causing network routing issues.

We now turn to FIG. 3B, which shows at a top portion thereof a simplified system view, with one client device 345 (representing one or more sending client devices 345 or 350), one first network node 305 (representing one or more first network nodes 305a-305n), one first intermediary network node 310 (representing one or more first intermediary network nodes 310), one second intermediary network node 365 (representing one or more second intermediary network nodes 365), one second network node 315 (representing one or more second network nodes 315a-315n), and one client device 355 (representing one or more destination client devices 355 or 360). Although only network node 315 is shown having computing device 335 and/or NIC/VNIC 340, the various embodiments are not so limited, and some or all of the other network nodes (i.e., network node 305, one or more of network node(s) 310, and/or one or more of network node(s) 365) might comprise similar computing device and/or similar NICs/VNICs. As shown in FIG. 3B, the first network(s) 320a, which might be one or more networks each associated with a single network service provider, and the second network(s) 320b might collectively span network nodes 305, 310, 365, and 315. Similar to the embodiment of FIG. 1B, the long-dash lines extending vertically from each of the network nodes 305, 310, 365, and 315 represents that the MAC address-based routing, steering, and/or forwarding of the data packet 370 (over layer 3) and the data frame 375 (over layer 2) occurs at each of these network nodes.

In the embodiment of FIG. 3B, network node 305 might receive data packet 370, which might comprise a header portion 370a and a packet data portion 370b. At least a portion of the header 370a might comprise a destination MAC address. As shown in FIG. 3B, the destination NIC/VNIC 340 might have an identifier, at least a portion of which might list a MAC address (which, in this case, is the same as the destination MAC address as listed in the header portion 370a of the data packet 370). The MAC address comprises an organizationally unique identifier ("OUI") 380 and a (universally) unique identifier ("UID") for the destination NIC/VNIC 385, similar to the OUI 180 and UID 185 of the embodiment as shown and described above with respect to FIG. 1B.

The destination MAC address in the embodiment of FIG. 3B comprises in the first through third octets an example OUI—in this case, "AC-01-BD" (which is a hexadecimal representation of an OUI that is represented with the most significant digits at the beginning and the least significant digits at the end), which is equivalent to "35:80:BD" when represented in the bit-reversed representation. The destination MAC address in FIG. 3B further comprises in the fourth through sixth octets an example UID of the destination NIC/VNIC—i.e., "02-FE-98" (which is a hexadecimal representation of the UID), which is equivalent to "40:7F:19" when represented in the bit-reversed representation.

The network node 305 might subsequently route, steer, and/or forward the data packet 370 over layer 3 (i.e., the network layer) of the first network(s) 320a, based at least in part on the MAC destination address in the header 370a of the data packet 370. In a similar manner, each network node 310 might receive the data packet 370, and might route, steer, and/or forward the data packet 370 over layer 3 (i.e., the network layer) of the first network(s) 320a, based at least in part on the MAC destination address in the header 370a of the data packet 370. Likewise, each network node 365 might receive the data packet 370, and might route, steer, and/or forward the data packet 370 over layer 3 (i.e., the network layer) of the second network(s) 320b, based at least in part on the MAC destination address in the header 370a of the data packet 370. Eventually, the network node 315 might receive the data packet 370, and might determine that the destination MAC Address in the header 370a of the data packet 370 matches the MAC address of a NIC or VNIC 340 that is comprised or hosted in a computing device 335 of the network node 315. Based on this determination, the network node 315 might determine which one or more client devices 355 to which the network node 315 is communicatively coupled (either wirelessly or via wired connection) is an intended recipient of the data packet 370, in some cases, based at least in part on other identifiers (not shown) in the header 370a of the data packet 370.

In some aspects, the routing, steering, and/or forwarding of the data packet 370 over layer 3 (i.e., the network layer) of the first network(s) 320a and/or the second network(s) 320b might comprise either steering and/or forwarding, with a software defined network ("SDN") controller (not shown) in the particular network node(s), the data packet 370 over layer 3 of the particular network(s) 320a and/or 320b, based at least in part on the MAC destination address in the header 370a of the data packet 370. In such embodiments, the SDN controller(s) might essentially use a "filter" (i.e., the MAC destination address) as a method for forwarding and/or steering the data packet over layer 3 of the particular network(s) 320a and/or 320b.

According to some embodiments, apart from the routing, steering, and/or forwarding of the data packet 370 over layer 3 (i.e., the network layer) of at least one of the first network(s) 320a and/or the second network(s) 320b, each of the abovementioned network nodes might also route, steer, and/or forward data frames 375 over layer 2 (i.e., the data link layer) of the at least one of the first network(s) 320a and/or the second network(s) 320b. In the particular example in FIG. 3B, for instance, network node 305 might receive data frame 375, which might comprise a header portion 375a and a frame data portion 375b. At least a portion of the header 375a might comprise a destination MAC address, which for purposes of illustration is the same as the destination MAC address in header 370a of data packet 370. As above, network node 305 might subsequently route, steer, and/or forward the data frame 375 over layer 2 (i.e., the data link layer) of the first network(s) 320a, based at least in part on the MAC destination address in the header 375a of the data frame 375. In a similar manner, each network node 310 might receive the data frame 375, and might route, steer, and/or forward the data frame 375 over layer 2 (i.e., the data link layer) of the first network(s) 320a, based at least in part on the MAC destination address in the header 375a of the data frame 375. Likewise, each network node 365 might receive the data frame 375, and might route, steer, and/or forward the data frame 375 over layer 3 (i.e., the network layer) of the second network(s) 320b, based at least in part on the MAC destination address in the header 375a of the data frame 375. Eventually, the network node 315 might receive the data frame 375, and might determine that the destination MAC Address in the header 375a of the data frame 375 matches the MAC address of a NIC or VNIC 340 that is comprised or hosted in a computing device 335 of the network node 315. Based on this determination, the network node 315 might determine which one or more client devices 355 to which the network node 315 is communicatively coupled (either wirelessly or via wired connection) is an intended recipient of the data frame 375, in some cases, based at least in part on other identifiers (not shown) in the header 375a of the data frame 375.

Regarding FIG. 4, while the techniques and procedures are depicted and/or described in a certain order for purposes of illustration, it should be appreciated that certain procedures may be reordered and/or omitted within the scope of various embodiments. Moreover, while the method 4 illustrated by FIG. 4 can be implemented by or with (and, in some cases, are described below with respect to) the system 300 of FIG. 3 (or components thereof), such methods may also be implemented using any suitable hardware (or software) implementation. Similarly, while the system 300 of FIG. 3 (or components thereof) can operate according to the method 400 illustrated by FIG. 4 (e.g., by executing instructions embodied on a computer readable medium), the system 300 of FIG. 3 can each also operate according to other modes of operation and/or perform other suitable procedures.

With reference to FIG. 4, method 400 might comprise, at block 405, receiving, at a network node in a first network, a data packet having a header comprising a media access control ("MAC") destination address.

At block 410, method 400 might comprise routing, with the network node, the data packet over open systems interconnection ("OSI") model layer 3 or network layer of at least one of the first network and/or the second network, based at least in part on the MAC destination address in the header of the data packet.

The MAC destination address might comprise a first portion comprising an organizationally unique identifier ("OUI") and a second portion comprising an identifier for one of a destination network interface controller ("NIC") or a destination virtual NIC ("VNIC"). In some embodiments, the OUI might be associated with a service provider associated with the one of the destination NIC or the destination VNIC, the first network and the second network are the same network, and the network node and the network might each be associated with the service provider that is associated with the one of the destination NIC or the destination VNIC. In alternative embodiments, the OUI might be associated with a service provider associated with the one of the destination NIC or the destination VNIC, the first network is different from the second network, and the network node and the network might each be associated with a second service provider that is different from the service provider that is associated with the one of the destination NIC or the destination VNIC. In yet other embodiments, the OUI might be associated with at least one of an application service provider or a content service provider, each of which is different from a service provider associated with the one of the destination NIC or the destination VNIC.

In some embodiments, routing the data packet over OSI model layer 3 or network layer of the each of the first network and/or the second network, based at least in part on the MAC destination address in the header of the data packet, might comprise one of steering or forwarding, with a software defined network ("SDN") controller in the network node, the data packet over OSI model layer 3 or network layer of at least one of the first network and/or the second network, based at least in part on the MAC destination address in the header of the data packet (block 415).

Method 400, in some embodiments, might further comprise receiving, at the network node, a data frame having a header comprising a second MAC destination address that is the same as the MAC destination address in the header of the data packet (optional block 420) and routing, with the network node, the data frame over OSI model layer 4 or data link layer of at least one of the first network and/or the second network, based at least in part on the same MAC destination address in the header of the data frame (optional block 425).

In some cases, the first network and/or the second network might each include, without limitation, one or more of a local area network ("LAN"), a wide area network ("WAN"), a wireless wide area network ("WWAN"), a virtual private network ("VPN"), the Internet, or an extranet, and/or the like. According to some embodiments, the network node might include, but is not limited to, one of a SDN controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device, and/or the like.

Exemplary System and Hardware Implementation

Figure 5:
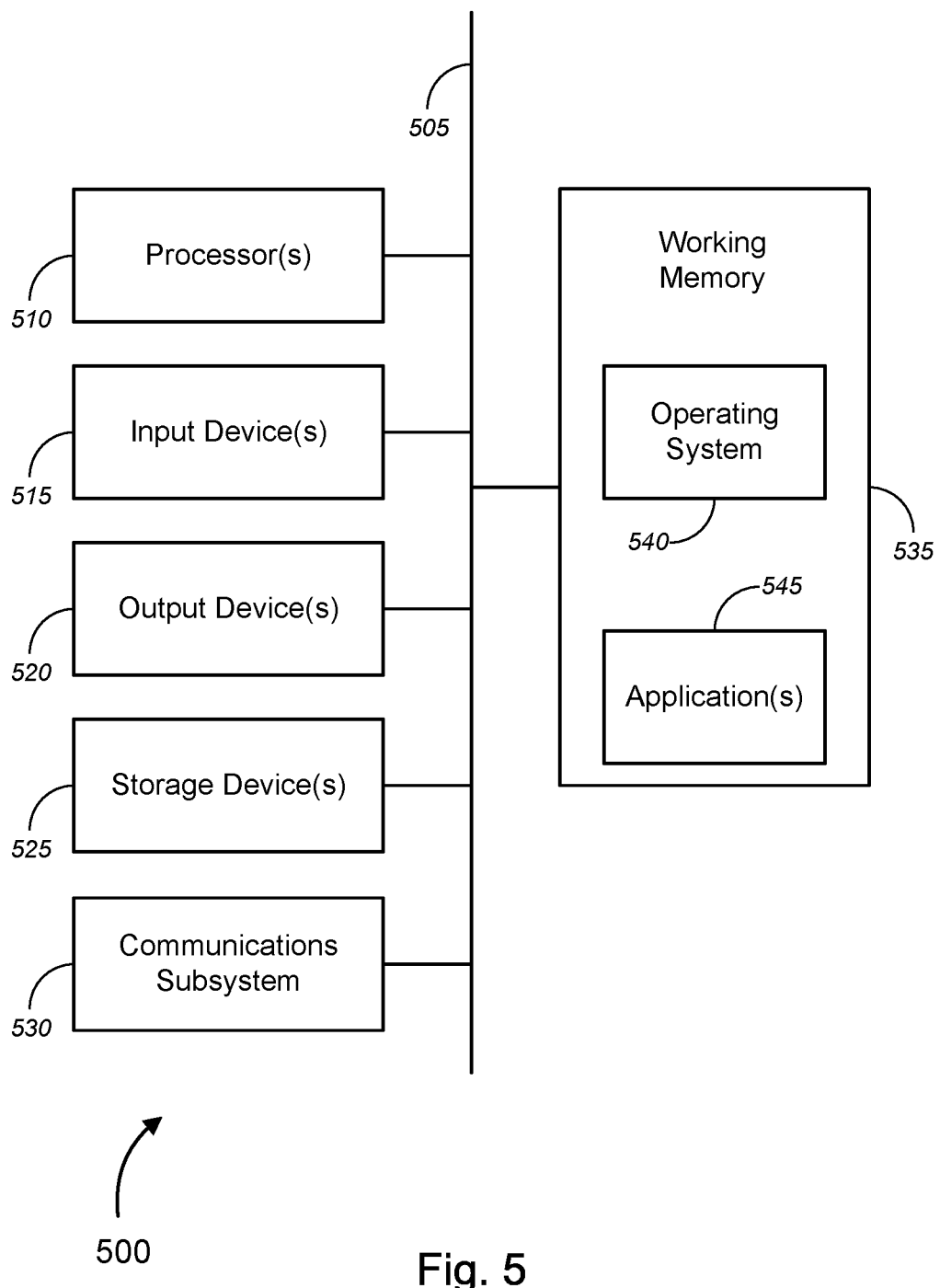
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., network nodes 105*a*-105*n*, 110, 115*a*-115*n*, 305*a*-305*n*, 310, 315*a*-315*n*, and/or 365, computing devices 125, 135, 325, and/or 335, network interface cards ("NICs")/virtual NICs ("VNICs") 130, 140, 330, and/or 340, client devices 145*a*-145*n*, 150*a*-150*n*, 155*a*-155*n*, 160*a*-160*n*, 345*a*-345*n*, 350*a*-350*n*, 355*a*-355*n*, and/or 360*a*-360*n*, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., network nodes 105*a*-105*n*, 110, 115*a*-115*n*, 305*a*-305*n*, 310, 315*a*-315*n*, and/or 365, computing devices 125, 135, 325, and/or 335, NICs/VNICs 130, 140, 330, and/or 340, client devices 145*a*-145*n*, 150*a*-150*n*, 155*a*-155*n*, 160*a*-160*n*, 345*a*-345*n*, 350*a*-350*n*, 355*a*-355*n*, and/or 360*a*-360*n*, etc.), described above with respect to FIGS. 1 and 3—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, sensors, and/or the like; and one or more output devices 520, which can include, without limitation, a display device, a printer, indicator lights, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, apps, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
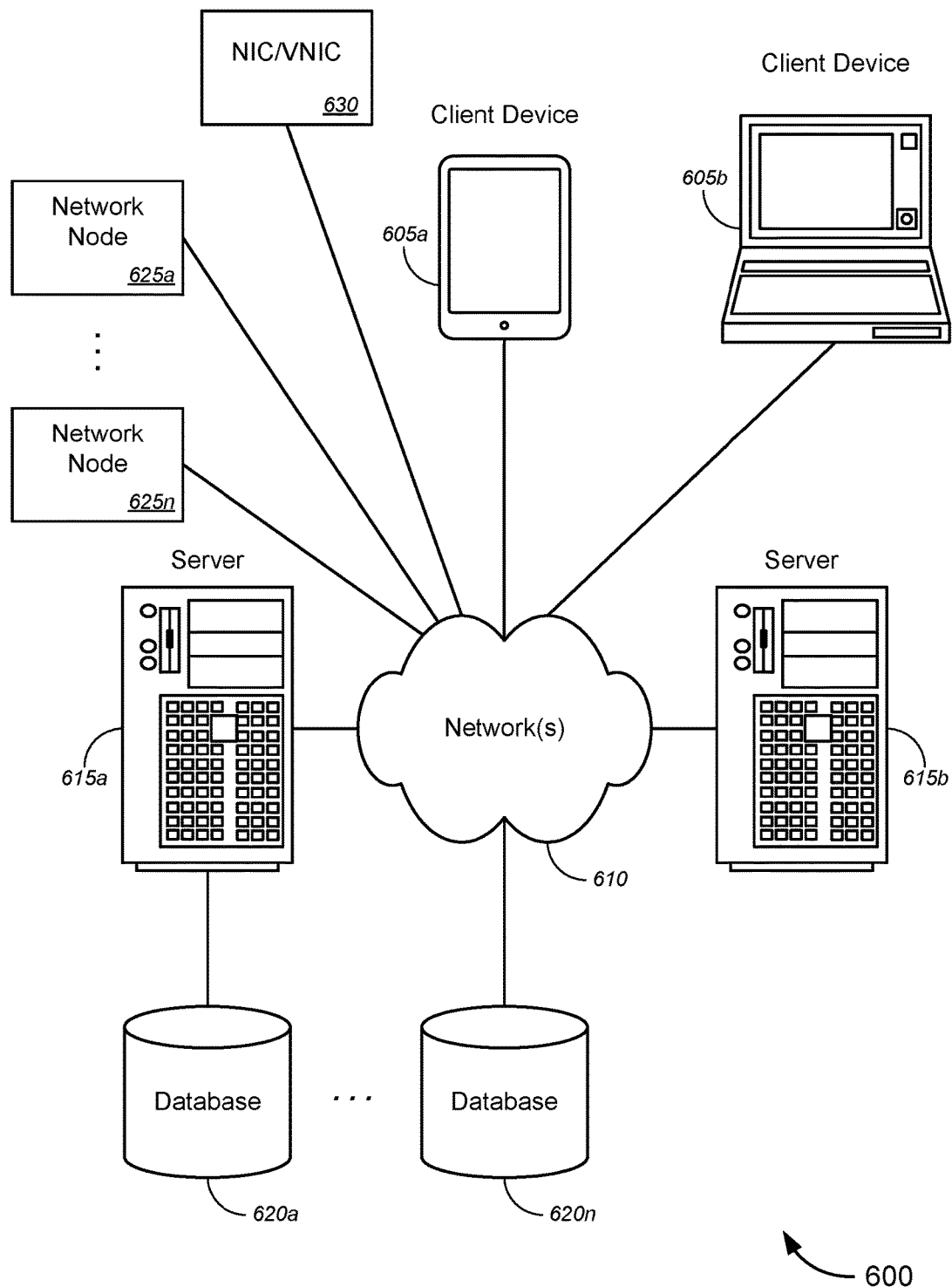
FIG. 6 is a block diagram illustrating a networked system of computers, computing systems, or system hardware architecture, which can be used in accordance with various embodiments.

As noted above, a set of embodiments comprises methods and systems for implementing virtual platforms within a network, and, in particular embodiments, to methods, systems, apparatus, and computer software for implementing virtual platform media access control ("MAC") address—based layer 2 and layer 3 network switching. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, smart phone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing virtual platform MAC address—based layer 2 and layer 3 network switching, or the like, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise one or more network nodes 625a-625n (collectively, "network nodes 625"), which might correspond to one or more of network nodes 105a-105n, 110, 115a-115n, 305a-305n, 310, 315a-315n, and/or 365 of FIGS. 1 and 3. System 600 might also comprise at least one network interface card ("NIC")/virtual NIC ("VNIC") 630, which might correspond to one or more of NICs/VNICs 130, 140, 330, and/or 340 of FIGS. 1 and 3, and/or the like. In some cases, client device 605 might correspond to client devices 145a-145n, 150a-150n, 155a-155n, 160a-160n, 345a-345n, 350a-350n, 355a-355n, and/or 360a-360n of FIGS. 1 and 3, while servers 615 might, in some (but not all) embodiments, correspond to computing devices 125, 135, 325, and/or 335 (which might be embodied in one or more network nodes 105a-105n, 110, 115a-115n, 305a-305n, 310, 315a-315n, and/or 365) of FIGS. 1 and 3, and databases 620 might correspond to databases that are not shown in FIGS. 1 and 3 that might store MAC Address tables, OUI tables, and/or the like that may be used for performing routing, steering, and/or forwarding of data packets or data frames over layer 3 and layer 2, respectively, of network(s) 610, which might correspond to networks 120, 320a, and 320b of FIGS. 1 and 3.

Each of one or more of the network nodes 625a-625n might receive a data packet having a header comprising a MAC destination address. The MAC destination address might comprise a first portion comprising an organizationally unique identifier ("OUI") and a second portion comprising an identifier for one of a destination network interface controller ("NIC") or a destination virtual NIC ("VNIC"). In some embodiments, the OUI might be associated with a service provider associated with the one of the destination NIC or the destination VNIC, and the network node and the network might each be associated with the service provider that is associated with the one of the destination NIC or the destination VNIC. In alternative embodiments, the OUI might be associated with a service provider associated with the one of the destination NIC or the destination VNIC, and the network node and the network might each be associated with a second service provider that is different from the service provider that is associated with the one of the destination NIC or the destination VNIC. In yet other embodiments, the OUI might be associated with at least one of an application service provider or a content service provider, each of which is different from a service provider associated with the one of the destination NIC or the destination VNIC. Each of the one or more network nodes 625a-625n might route the data packet over open systems interconnection ("OSI") model layer 3 or network layer of the network, based at least in part on the MAC destination address in the header of the data packet. In some cases, routing the data packet over OSI model layer 3 or network layer of the network, based at least in part on the MAC destination address in the header of the data packet, might comprise one of steering or forwarding, with a software defined network ("SDN") controller in the network node, the data packet over OSI model layer 3 or network layer of the network, based at least in part on the MAC destination address in the header of the data packet.

In some cases, each of the one or more network nodes 625a-625n might additionally receive a data frame having a header comprising a second MAC destination address that is the same as the MAC destination address in the header of the data packet, and might route the data frame over OSI model layer 2 or data link layer of the network, based at least in part on the same MAC destination address in the header of the data frame.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, at a network node in a network, a data packet having a header comprising a media access control ("MAC") destination address, wherein the MAC destination address comprises a first portion comprising an organizationally unique identifier ("OUI") and a second portion comprising an identifier for one of a destination network interface controller ("NIC") or a destination virtual NIC ("VNIC"); and
   routing, with the network node, the data packet over open systems interconnection ("OSI") model layer 3 or network layer of the network, across two or more networks, using the MAC destination address comprising the OUI in the header of the data packet, wherein the MAC destination address comprising the OUI is the same MAC destination address that is inserted at an originating network among the two or more networks, the originating network being different from a destination network among the two or more networks.

2. The method of claim 1, wherein the OUI is associated with a service provider associated with the one of the destination NIC or the destination VNIC, and wherein the network node and the network are each associated with the service provider that is associated with the one of the destination NIC or the destination VNIC.

3. The method of claim 1, wherein the OUI is associated with a service provider associated with the one of the destination NIC or the destination VNIC, and wherein the network node and the network are each associated with a second service provider that is different from the service provider that is associated with the one of the destination NIC or the destination VNIC.

4. The method of claim 1, wherein the OUI is associated with at least one of an application service provider or a content service provider, each of which is different from a service provider associated with the one of the destination NIC or the destination VNIC.

5. The method of claim 1, wherein routing the data packet over OSI model layer 3 or network layer of the network, based at least in part on the MAC destination address in the header of the data packet, comprises one of steering or forwarding, with a software defined network ("SDN") controller in the network node, the data packet over OSI model layer 3 or network layer of the network, based at least in part on the MAC destination address in the header of the data packet.

6. The method of claim 1, further comprising:
   receiving, at the network node, a data frame having a header comprising a second MAC destination address that is the same as the MAC destination address in the header of the data packet; and
   routing, with the network node, the data frame over OSI model layer 2 or data link layer of the network, based at least in part on the same MAC destination address in the header of the data frame.

7. The method of claim 1, wherein the network comprises one or more of a local area network ("LAN"), a wide area network ("WAN"), a wireless wide area network ("WWAN"), a virtual private network ("VPN"), the Internet, or an extranet.

8. The method of claim 1, wherein the network node comprises one of a software defined network ("SDN") controller, a network switch, a router, a server computer, a gateway device, an optical network terminal ("ONT"), a network interface device ("NID"), an enhanced NTD ("eNID"), a residential gateway ("RG") device, a business gateway ("BG") device, or a virtual gateway ("vG") device.

9. A network node in a network, the network node comprising:
   at least one processor; and
   a non-transitory computer readable medium communicatively coupled to the at least one processor, the non-transitory computer readable medium having stored thereon computer software comprising a set of instructions that, when executed by the at least one processor, causes the network node to:
      receive a data packet having a header comprising a media access control ("MAC") destination address, wherein the MAC destination address comprises a first portion comprising an organizationally unique identifier ("OUI") and a second portion comprising an identifier for one of a destination network interface controller ("NIC") or a destination virtual NIC ("VNIC"); and
      route the data packet over open systems interconnection ("OSI") model layer 3 or network layer of the network, across two or more networks, using the MAC destination address comprising the OUI in the header of the data packet, wherein the MAC destination address comprising the OUI is the same MAC destination address that is inserted at an originating network among the two or more networks, the originating network being different from a destination network among the two or more networks.

10. The network node of claim 9, wherein the OUI is associated with a service provider associated with the one of the destination NIC or the destination VNIC, and wherein the network node and the network are each associated with the service provider that is associated with the one of the destination NIC or the destination VNIC.

11. The network node of claim 9, wherein the OUI is associated with a service provider associated with the one of the destination NIC or the destination VNIC, and wherein the network node and the network are each associated with a second service provider that is different from the service provider that is associated with the one of the destination NIC or the destination VNIC.

12. The network node of claim 9, wherein the OUI is associated with at least one of an application service provider or a content service provider, each of which is different from a service provider associated with the one of the destination NIC or the destination VNIC.

13. The network node of claim 9, wherein routing the data packet over OSI model layer 3 or network layer of the network, based at least in part on the MAC destination address in the header of the data packet comprises one of steering or forwarding, with a software defined network ("SDN") controller in the network node, the data packet over OSI model layer 3 or network layer of the network, based at least in part on the MAC destination address in the header of the data packet.

14. The network node of claim 9, wherein the set of instructions, when executed by the at least one processor, further causes the network node to:
   receive a data frame having a header comprising a second MAC destination address that is the same as the MAC destination address in the header of the data packet; and
   route the data frame over OSI model layer 2 or data link layer of the network, based at least in part on the same MAC destination address in the header of the data frame.

15. The network node of claim 9, wherein the network comprises one or more of a local area network ("LAN"), a wide area network ("WAN"), a wireless wide area network ("WWAN"), a virtual private network ("VPN"), the Internet, or an extranet.

16. The network node of claim 9, wherein the network node comprises one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device.

17. A system, comprising:
   one of a destination network interface controller ("NIC") or a destination virtual NIC ("VNIC") in a first network; and
   a network node in a second network, the network node comprising:
      at least one processor; and
      a non-transitory computer readable medium communicatively coupled to the at least one processor, the non-transitory computer readable medium having stored thereon computer software comprising a set of instructions that, when executed by the at least one processor, causes the network node to:
         receive a data packet having a header comprising a media access control ("MAC") destination address, wherein the MAC destination address comprises a first portion comprising an organizationally unique identifier ("OUI") and a second portion comprising an identifier for one of a destination network interface controller ("NIC") or a destination virtual NIC ("VNIC"); and
         route the data packet over open systems interconnection ("OSI") model layer 3 or network layer of at least one of the first network or the second network, across two or more networks, using the MAC destination address comprising the OUI in the header of the data packet, wherein the MAC destination address comprising the OUI is the same MAC destination address that is inserted at an originating network among the two or more networks, the originating network being different from a destination network among the two or more networks.

18. The system of claim 17, wherein the OUI is associated with a service provider associated with the one of the destination NIC or the destination VNIC, wherein the first network and the second network are the same network, and wherein the network node and the second network are each associated with the service provider that is associated with the one of the destination NIC or the destination VNIC.

19. The system of claim 17, wherein the OUI is associated with a service provider associated with the one of the destination NIC or the destination VNIC, wherein the first network is different from the second network, and wherein the network node and the second network are each associated with a second service provider that is different from the service provider that is associated with the one of the destination NIC or the destination VNIC.

20. The system of claim 17, wherein the OUI is associated with at least one of an application service provider or a content service provider, each of which is different from a service provider associated with the one of the destination NIC or the destination VNIC.

21. The system of claim 17, wherein routing the data packet over OSI model layer 3 or network layer of the at least one of the first network or the second network, based at least in part on the MAC destination address in the header of the data packet, comprises one of steering or forwarding, with a software defined network ("SDN") controller in the network node, the data packet over OSI model layer 3 or network layer of the at least one of the first network or the second network, based at least in part on the MAC destination address in the header of the data packet.

22. The system of claim 17, wherein the set of instructions, when executed by the at least one processor, further causes the network node to:
  receive a data frame having a header comprising a second MAC destination address that is the same as the MAC destination address in the header of the data packet; and
  route the data frame over OSI model layer 2 or data link layer of at least one of the first network or the second network, based at least in part on the same MAC destination address in the header of the data frame.

23. The system of claim 17, wherein the first network and the second network each comprises one or more of a local area network ("LAN"), a wide area network ("WAN"), a wireless wide area network ("WWAN"), a virtual private network ("VPN"), the Internet, or an extranet.

24. The system of claim 17, wherein the network node comprises one of a software defined network ("SDN") controller, a network switch, a router, a server computer, a gateway device, an optical network terminal ("ONT"), a network interface device ("NID"), an enhanced NID ("eNID"), a residential gateway ("RG") device, a business gateway ("BG") device, or a virtual gateway ("vG") device.

\* \* \* \* \*